US012689080B2

(12) United States Patent
Zhang et al.

(10) Patent No.: US 12,689,080 B2
(45) Date of Patent: Jul. 21, 2026

(54) BATTERY COVER PLATE, BATTERY, AND POWER SYSTEM

(71) Applicant: Huawei Digital Power Technologies Co., Ltd., Shenzhen (CN)

(72) Inventors: Yezheng Zhang, Dongguan (CN); Jinxing Yang, Dongguan (CN); Jing Zhu, Dongguan (CN); Zheng Zhong, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 608 days.

(21) Appl. No.: 18/176,977

(22) Filed: Mar. 1, 2023

(65) Prior Publication Data

US 2023/0282914 A1 Sep. 7, 2023

(30) Foreign Application Priority Data

Mar. 1, 2022 (CN) .......................... 202210194340.7

(51) Int. Cl.
| | |
|---|---|
| *H01M 50/15* | (2021.01) |
| *H01M 10/42* | (2006.01) |
| *H01M 10/48* | (2006.01) |

(52) U.S. Cl.
CPC ......... *H01M 50/15* (2021.01); *H01M 10/425* (2013.01); *H01M 10/486* (2013.01); *H01M 2010/4271* (2013.01); *H01M 2010/4278* (2013.01)

(58) Field of Classification Search
CPC ... H01M 50/15; H01M 10/425; H01M 10/486
See application file for complete search history.

(56) References Cited

U.S. PATENT DOCUMENTS

| | | | |
|---|---|---|---|
| 2017/0080861 A1* | 3/2017 | Vora ...................... | H04N 23/51 |
| 2019/0081372 A1* | 3/2019 | Capati ................ | H01M 50/516 |

FOREIGN PATENT DOCUMENTS

| | | |
|---|---|---|
| CN | 102299268 B | 4/2016 |
| CN | 107895761 A | 4/2018 |
| CN | 110473991 A | 11/2019 |
| CN | 110492023 A | 11/2019 |
| CN | 112290107 A | 1/2021 |
| CN | 113258147 A | 8/2021 |
| CN | 214336836 U | 10/2021 |
| EP | 2600443 A2 | 6/2013 |

* cited by examiner

*Primary Examiner* — Olatunji A Godo
(74) *Attorney, Agent, or Firm* — Leydig, Voit & Mayer, Ltd.

(57) ABSTRACT

A battery cover plate is provided, to resolve problems such as a signal transmission structure and sealing performance of the battery cover plate. The battery cover plate includes a plate body, a battery management unit, and a sensor assembly, wherein the plate body has an outer surface and an inner surface facing away from the outer surface. The battery management unit is disposed in the plate body, wherein a transmission structure is provided between the battery management unit and the outer surface, and the battery management unit includes a wireless communication module. The wireless communication module may perform wireless communication with the outside by using the transmission structure. The sensor assembly is connected to the battery management unit, wherein the sensor assembly is disposed in the plate body and extends out of the inner surface.

20 Claims, 5 Drawing Sheets

BATTERY COVER PLATE, BATTERY, AND POWER SYSTEM

CROSS-REFERENCE TO RELATED APPLICATION

This application claims priority to Chinese Patent Application No. 202210194340.7, filed on Mar. 1, 2022, which is hereby incorporated by reference in its entirety.

TECHNICAL FIELD

Embodiments of this application relate to the field of battery technologies, and in particular, to a battery cover plate, a battery, and a power system.

BACKGROUND

With the continuous popularization and development of clean energy, batteries are widely used in scenarios such as data centers, base stations, mobile phones, and vehicles. Moreover, the batteries are required to have higher use safety and better intelligence.

In practical application of the battery, a health status of the battery needs to be effectively monitored, to ensure use safety and service life of the battery. The battery mainly includes a housing and a bare cell located inside the housing. To monitor the health status of the battery, the current battery may further include a battery management unit (BMU) and a sensor assembly. The battery management unit is usually disposed outside the housing, and the sensor assembly needs to be disposed inside the housing to effectively detect parameters such as a temperature, pressure, and gas composition inside the housing. Currently, the housing is usually made of a metal material such as aluminum alloy. Therefore, the housing has electromagnetic shielding performance. The battery management unit and the sensor assembly need to be connected through a cable, and the cable needs to pass through the housing. Therefore, there are problems such as complex sealing and difficulty in ensuring sealing between the cable and the housing, so that safety of the battery cannot be effectively ensured. In addition, a manufacturing process is also complex.

SUMMARY

This application provides a battery cover plate, a battery, and a power system that are easy to manufacture and capable of effectively ensuring sealing and use safety of the battery.

According to an aspect, this application provides a battery cover plate, including a plate body, a battery management unit, and a sensor assembly. The plate body is provided with an outer surface and an inner surface facing away from the outer surface. The battery management unit is disposed in the plate body, where a transmission structure is provided between the battery management unit and the outer surface, the battery management unit includes a wireless communication module, and the wireless communication module is capable of performing wireless communication with the outside by using the transmission structure. The sensor assembly is connected to the battery management unit, where the sensor assembly is disposed in the plate body and extends out of the inner surface.

It should be noted that, in specific application, the battery may include the battery cover plate, the housing, and the bare cell. The housing may have a groove, and the bare cell may be disposed in the groove. The inner surface of the battery cover plate faces the groove and seals an opening of the groove. In other words, the battery cover plate and the housing may form a closed groove, so as to ensure sealing of the bare cell. The sensor assembly may be configured to detect parameters such as temperature of the groove (or the bare cell), barometric pressure in the groove, and gas composition. The sensor assembly is connected to the battery management unit, so that detected information of the sensor assembly can be transmitted to the battery management unit. The battery management unit may be connected to a positive tab and a negative tab of the bare cell, and is configured to detect parameters such as a status of charges, a health status, and a power status of the bare cell. Because the plate body has the transmission structure for electromagnetic wave penetration, the battery management unit may transmit, to an external battery management system or the like by using the wireless communication module, the detected information obtained by the sensor assembly. Alternatively, it may be understood that, in the battery cover plate provided in this application, the transmission structure for electromagnetic wave propagation is disposed, so that the battery management unit disposed in the plate body of the battery cover plate can be communicatively connected to the battery management system in a wireless communication manner, thereby avoiding arrangement of the cable, and effectively ensuring the sealing of the battery cover plate. In addition, in a wireless communication manner, flexibility of the battery during deployment can be improved, constraint of the cable is avoided, and maintenance difficulty can also be reduced.

In an example, the battery cover plate may include an insulator, and the battery management unit may be located in the insulator. The battery management unit is disposed in the insulator, which can not only protect the battery management unit well, prevent the battery management unit from being corroded by external impurities such as dust or water vapor, but also increase connection strength between the battery management unit and the plate body, and effectively prevent an adverse situation such as shaking or disengagement between the battery management unit and the plate body.

In specific arrangement, the insulator may be disposed in various positions in the plate body.

For example, the insulator may be located between the outer surface and the inner surface. To enable the battery management unit in the insulator to communicate with the outside in wireless mode, an end of the transmission structure may extend to the insulator.

The transmission structure may be a structure such as a gap or a blind via. A specific shape of the transmission structure is not limited in this application. In addition, the transmission structure may be further filled with an insulating material, so as to improve flatness of the inner surface.

Alternatively, in an example, the insulator and the insulating material filled in the transmission structure may be an integrally formed structure, so as to improve convenience in manufacturing.

Alternatively, in an example, an end of the insulator may extend to the inner surface, the sensor assembly may be disposed on the insulator, and a part (for example, a detection head) used for detection in the sensor assembly may extend out of an end surface of a second end. During manufacturing, the battery management unit and the sensor assembly may be plastic-packaged in the insulator, so as to simplify a manufacturing process.

In addition, in specific application, the plate body may be made of a metal material such as aluminum or aluminum alloy. The insulator is prepared by injection molding or compression molding. Alternatively, an entire plate body may be made of an insulating material, and the insulator may be a part of an area of the plate body.

In specific application, the sensor assembly may include a temperature sensor, a barometric pressure sensor, a gas sensor, or the like. The temperature sensor may be configured to detect temperature of the bare cell (or in the groove). The barometric pressure sensor may be configured to detect barometric pressure in the groove. The gas sensor may be configured to detect gas composition in the groove, or may detect a proportion of the gas composition, or the like. In addition, the sensor assembly may be disposed in the insulator, or may be disposed on the inner surface of the plate body. Alternatively, some sensors in the sensor assembly may be disposed in the insulator, and other sensors may be disposed on the inner surface of the plate body. A quantity and types of sensors included in the sensor assembly are not limited in this application.

In an example, the battery cover plate may further include a positive-electrode pole and a negative-electrode pole. The positive-electrode pole and the negative-electrode pole may be disposed on the plate body, and the battery management unit is connected to the positive-electrode pole and negative-electrode pole.

In specific application, the positive-electrode pole may be connected to a positive tab of the bare cell, and the negative-electrode pole may be connected to a negative tab of the bare cell. The positive-electrode pole and the negative-electrode pole may extend out of the outer surface, so as to be connected to another electric device or power supply device.

In addition, the battery management unit may be connected to the positive-electrode pole and negative-electrode pole. Therefore, the battery management unit may be powered by the bare cell, to avoid that an additional power supply is disposed to supply power to the battery management unit.

In an example, the battery management system may further include a power supply control circuit, and the sensor assembly may be connected to the battery management system by using the power supply control circuit. Alternatively, electric energy may supply power to the sensor assembly by using the power supply control circuit. The battery management system may connect or disconnect power supply to/from the sensor assembly by using the power supply control circuit, so as to achieve an effect of energy conservation.

In an example, the battery cover plate may further include an explosion-proof structure, and the explosion-proof structure may be disposed on the plate body. The explosion-proof structure may be a structure such as an explosion-proof valve or an explosion-proof film. When pressure in the groove is excessively large, pressure relief may be performed by using the explosion-proof structure, so as to prevent an adverse situation such as battery explosion.

According to another aspect, this application further provides a battery, which may include a housing and a bare cell. The housing has a groove, and the bare cell may be disposed in the groove. The battery may further include any one of the foregoing battery cover plates. The battery cover plate may cover an opening of the groove, with the inner surface disposed facing the groove, and the sensor assembly extends into the groove.

In specific application, the housing may have one groove, or may have a plurality of grooves. When the housing has a plurality of grooves, the battery cover plate may cover the opening of each groove at the same time. A quantity of disposed sensor assemblies in the battery cover plate may be the same as a quantity of disposed grooves, and the sensor assemblies are disposed in one-to-one correspondence with the grooves.

In addition, when the battery management unit is disposed, a quantity of disposed battery management units may be the same as a quantity of disposed sensor assemblies, or a quantity of disposed battery management units may be less than a quantity of disposed sensor assemblies.

In addition, in an example, the battery may further include a battery management system, and the battery management unit is connected to the battery management system in a wireless communication manner. In specific application, the battery management unit may send detected information to the battery management system, and the battery management system may separately manage each battery management unit according to the detected information, so as to implement refined management.

According to another aspect, this application further provides a power system, which may include any one of the foregoing batteries. The inverter may be connected to a battery, and may be configured to convert an alternating current into a direct current and then provide the direct current to the battery, or convert a direct current from the battery into an alternating current. In specific application, the power system may be an energy storage system, or may be a solar or wind power system. A specific type of the power system is not limited in this application.

DESCRIPTION OF EMBODIMENTS

To make objectives, technical solutions, and advantages of this application clearer, the following further describes this application in detail with reference to the accompanying drawings.

To facilitate understanding of the battery cover plate provided in embodiments of this application, an application scenario thereof is first described below.

Figure 1:
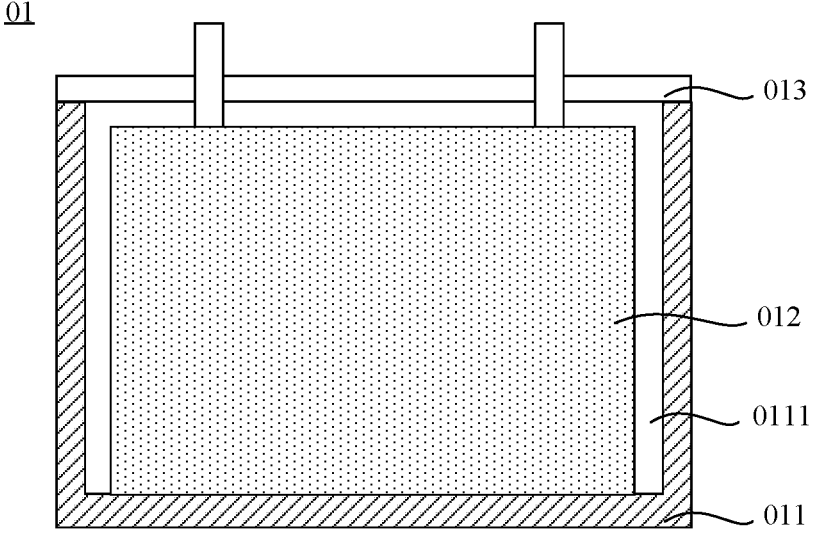
FIG. 1 is a schematic diagram of a cross-sectional structure of a conventional battery according to an embodiment of this application.

FIG. 1 shows a conventional battery 01 according to an embodiment of this application. The battery 01 mainly includes a housing 011, a bare cell 012, and a battery cover plate 013. Specifically, the housing 011 has a groove 0111, the bare cell 012 is disposed in the groove 0111, and the battery cover plate 013 covers an opening of the groove 0111 to ensure sealing of the groove 0111. During actual application, a medium such as an electrolyte is usually disposed in the groove 0111, to ensure a normal charging/discharging function of the bare cell 012. In addition, in a process of using the battery 01, a case such as excessive charge/discharge, a pressure change, a temperature change, or a gas composition change may occur in the bare cell 012 (or in the groove 0111). Therefore, to ensure use safety of the battery 01, electricity, a temperature, and gas composition inside the battery 01 (or the bare cell) need to be effectively monitored.

Figure 2:
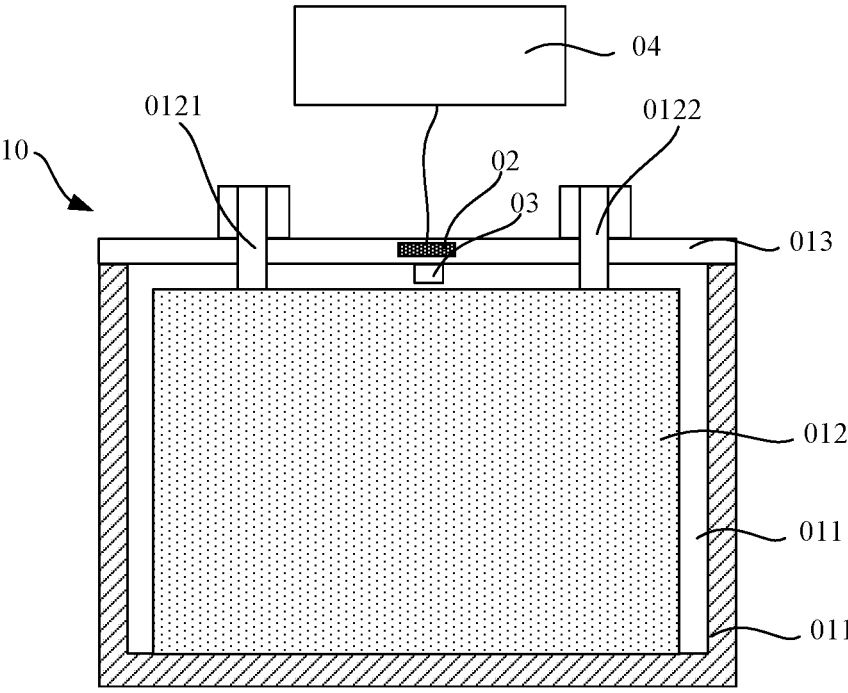
FIG. 2 is a schematic diagram of a cross-sectional structure of another conventional battery according to an embodiment of this application.

Details are shown in FIG. 2. Currently, to implement intelligent management and control on the battery 01, a battery management unit 02, a sensor assembly 03, and a battery management system 04 are usually configured. The battery management unit 02 and the sensor assembly 03 may be fastened to the battery cover plate 013. Specifically, the sensor assembly 03 may extend into the groove 0111, and is configured to effectively detect the temperature, pressure, and gas composition in the groove 0111, and send detected data to the battery management unit 02. The battery management unit 02 may send the detected data to the battery management system 04. In addition, the battery management unit 02 may be connected to a positive tab 0121 and a negative tab 0122 of the bare cell 012, and is configured to detect parameters such as a state of charge (SOC), a health status, and a power status of the bare cell 012. The battery management system 04 may adjust temperature of the battery 01 based on the detected data of the sensor assembly 03 and the battery management unit 02, or the battery management system 04 may regulate and control a charging/discharging state of the battery 01 by using the battery management unit 02, or the like. Currently, the battery cover plate 013 is generally made of a metal material such as aluminum or aluminum alloy, and has electromagnetic shielding performance. If the battery management unit 02 is disposed inside the battery cover plate 013, the battery management unit 02 needs to be connected to the battery management system 04 through a cable 05. In addition, a through hole (not shown in the figure) for the cable 05 to pass through needs to be disposed in the battery cover plate 013. However, a disposed through hole may damage sealing performance of the battery 01, and increase a safety hazard of the battery 01. If sealing processing is performed between the cable 05 and the battery cover plate 013, problems such as a complex process and low reliability exist.

Therefore, an embodiment of this application provides a battery cover plate that has a simple structure, is easy to implement, and can effectively improve battery safety.

To make objectives, technical solutions, and advantages of this application clearer, the following further describes this application in detail with reference to the accompanying drawings and specific embodiments.

Terms used in the following embodiments are merely intended to describe specific embodiments, but are not intended to limit this application. As used in the specification of this application and the appended claims, singular expression forms "one", "a", and "this" are intended to also include an expression form such as "one or more", unless otherwise specified in the context. It should be further understood that, in the following embodiments of this application, "at least one" means one, two, or more.

Reference to "an embodiment" described in this specification or the like means that one or more embodiments of this application include a particular feature, structure, or characteristic described with reference to the embodiment. Therefore, in this specification, statements, such as "in an embodiment", "in some embodiments", and "in other embodiments", that appear at different places do not necessarily mean referring to a same embodiment, instead, the statements mean referring to "one or more but not all of the embodiments", unless otherwise specifically emphasized in other ways. The terms "include", "have", and variants thereof all mean "including but not limited to", unless otherwise specifically emphasized in another manner.

Figure 3:
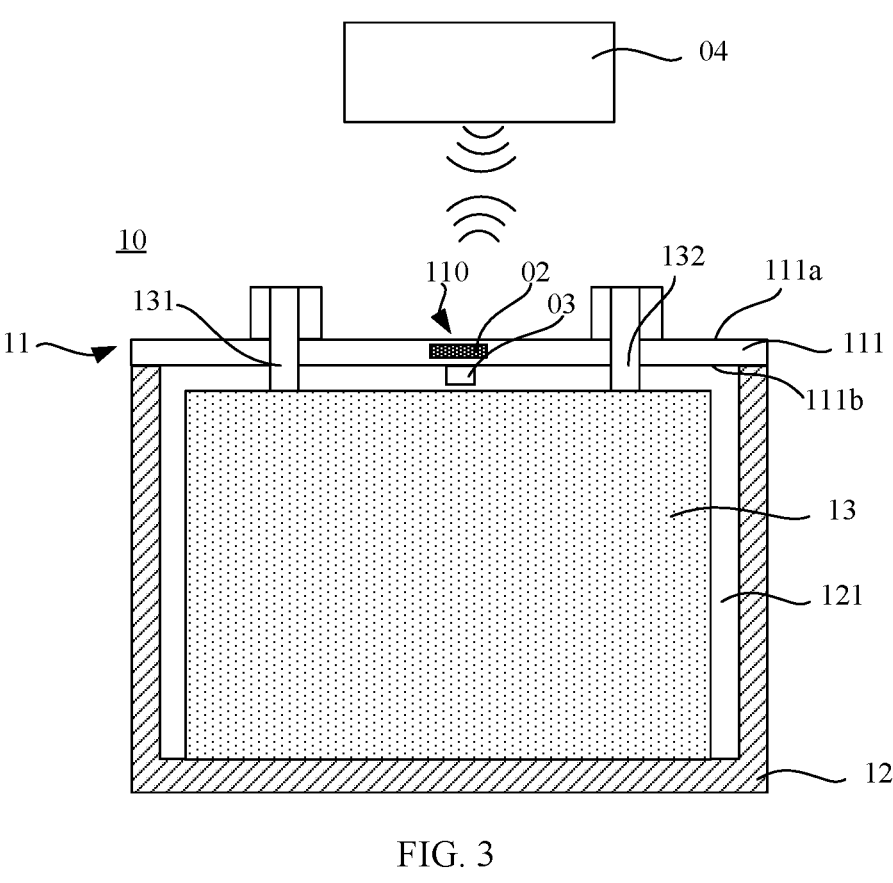
FIG. 3 is a schematic diagram of a cross-sectional structure of a battery according to an embodiment of this application.

As shown in FIG. 3, in an embodiment provided in this application, a battery 10 may include a battery cover plate 11, a housing 12, and a bare cell 13. The housing 12 has a groove 121, the bare cell 13 is disposed in the groove 121, and the battery cover plate 11 covers an opening of the groove 121. In other words, the battery cover plate 11 and the housing 12 may form a closed structure, so as to ensure sealing of the bare cell 13. The battery cover plate 11 may include a plate body 111, a battery management unit 02, and a sensor assembly 03. Specifically, the plate body 111 is provided with an outer surface 111a (for example, an upper plate surface in the figure) and an inner surface 111b (for example, a lower plate surface in the figure) facing away from the outer surface 111a, and the outer surface 111a has a transmission structure 110 for electromagnetic wave propagation. The battery management unit 02 is disposed in the plate body 111, the battery management unit 02 includes a wireless communication module, and the wireless communication module may perform wireless communication with the outside by using the transmission structure 110. The sensor assembly 03 extends out of the inner surface 111b, and is connected to the battery management unit 02. Specifically, the sensor assembly 03 may be configured to detect parameters such as temperature of the groove 121 (or the bare cell 13), barometric pressure in the groove 121, and gas composition. The sensor assembly 03 is connected to the battery management unit 02, so that detected information of the sensor assembly 03 can be transmitted to the battery management unit 02. The battery management unit 02 may be connected to a positive tab 131 and a negative tab 132 of the bare cell 13, and is configured to detect parameters such as a state of charge, a health status, and a power status of the bare cell 13. Because the plate body 111 has the transmission structure 110 for electromagnetic wave penetration, the battery management unit 02 may transmit, to an external battery management system 04 or the like by using the wireless communication module, the detected information obtained by the sensor assembly 03. Alternatively, it may be understood that, in the battery cover plate 11 provided in this application, the transmission structure 110 for electromagnetic wave propagation is disposed, so that the battery management unit 02 disposed in the plate body 111 of the battery cover plate 11 can be communicatively connected to the battery management system 04 in a wireless communication manner, thereby avoiding arrangement of the cable, and effectively ensuring sealing of the battery cover plate 11. In addition, in a wireless communication manner, flexibility of the battery 10 during deployment can be improved, constraint of the cable is avoided, and maintenance difficulty can also be reduced.

It should be noted that the bare cell 13 is an electrochemical cell including a positive electrode and a negative electrode, and a specific chemical composition and a type of the bare cell 13 are not limited in this application. Alternatively, the battery 10 may be a lithium battery, a lead-acid battery, a lithium-sulfur battery, a sodium battery, a magnesium battery, an aluminum battery, a potassium battery, or the like. In addition, the wireless communication module may be a device that meets a wireless technical standard such as Bluetooth or Wi-Fi. A specific type, an operating frequency band, and a technical standard of the wireless communication module are not limited in this application.

In specific application, the plate body 111 may be made of a metal material such as aluminum, aluminum alloy, or steel, so that the plate body 111 has good structural strength. Certainly, the plate body 111 made of a metal material generally has an electromagnetic shielding function. Therefore, in an embodiment provided in this application, after the transmission structure 110 is disposed, the battery management unit 02 located inside the plate body 111 can communicate with the external battery management system 04 in a wireless communication manner. It may be understood that, in other embodiments, the plate body 111 may also be made of at least one material of polymers, such as polypropylene, polyvinylidene fluoride, polyethylene, polymethyl methacrylate, and polyvinyl acetate, and a copolymer thereof. Alternatively, it may be understood that the plate body 111 may be made of an insulating material, so that an entire plate body 111 does not have the electromagnetic shielding function. Therefore, the battery management unit 02 disposed inside the plate body 111 can communicate with the outside in a wireless communication manner.

It should be noted that, when the plate body 111 is made of a material that does not have an electromagnetic shielding effect or has a relatively weak electromagnetic shielding effect, such as the insulating material, the transmission structure 110 may be a partial area of the plate body 111 between the outer surface 111a and the battery management unit 02, or the transmission structure 110 may alternatively be a structure having an entity shape such as a gap or a blind via extending from the outer surface 111a to the battery management unit 02.

For ease of understanding technical solutions of this application, the following uses an example in which the plate body 111 is made of the material having the electromagnetic shielding effect such as metal for description.

In specific application, the battery management unit 02 may be disposed in various manners.

Figure 4:
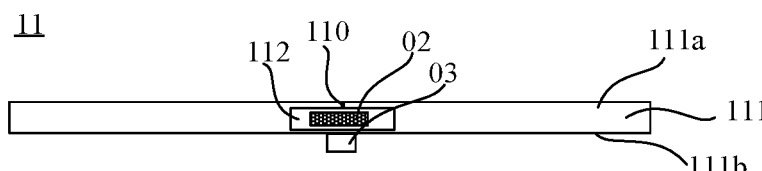
FIG. 4 is a schematic diagram of a cross-sectional structure of another battery cover plate according to an embodiment of this application.

For example, as shown in FIG. 4, in another example provided in this application, the battery cover plate 11 may further include an insulator 112, and the battery management unit 02 may be located in the insulator 112. During manufacturing, an accommodating cavity (not shown in the figure) configured to accommodate the insulator 112 may be disposed in the plate body 111. Then, the battery management unit 02 is placed in the accommodating cavity, and finally the insulating material is injected into the accommodating cavity. After the insulating material is cured and formed, the insulator 112 may be formed. Alternatively, the battery management unit 02 may be plastic-packaged in the insulator 112 by using an injection molding process, and then the insulator 112 having the battery management unit 02 is fastened in the accommodating cavity.

The insulator 112 may be made of an insulating material such as a polymer such as polypropylene, polyvinylidene fluoride, polyethylene, polymethyl methacrylate, and polyvinyl acetate, and a copolymer thereof, so that electromagnetic waves can propagate through the insulator 112. The battery management unit 02 is disposed in the insulator 112, which can not only protect the battery management unit 02 well, prevent the battery management unit 02 from being corroded by external impurities such as dust or water vapor, but also increase connection strength between the battery management unit 02 and the plate body 111, and effectively prevent an adverse situation such as shaking or disengagement between the battery management unit 02 and the plate body 111.

During specific implementation, the insulator 112 may be located in various positions in the plate body 111.

For example, as shown in FIG. 4, this application provides an example. The insulator 112 is located inside the plate body 111, meaning that the insulator 112 does not extend to the outer surface 111a or the inner surface 111b.

In addition, to enable the battery management unit 02 to perform wireless communication with the outside, an end of the transmission structure 110 may extend to the insulator 112. It should be known that the end of the transmission structure 110 is a part of the transmission structure 110 that faces the insulator. Specifically, the part that faces the insulator may be a regular or irregular surface. It should be noted that the end of the transmission structure 110 does not mean that the transmission structure 110 is narrow and long in a thickness direction of the insulator 112.

Figure 5:
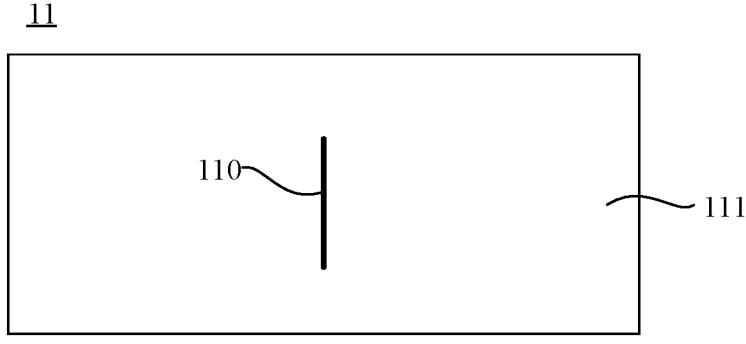
FIG. 5 is a top view of FIG. 4.

For example, refer to FIG. 4 and FIG. 5. In an example provided in this application, the transmission structure 110 is specifically a gap, the gap has a specific depth, and a bottom end of the gap extends to an upper surface of the insulator 112. The upper surface of the insulator 112 is a surface of the insulator 112 that faces and is close to the outer surface 111a. An electromagnetic wave generated by the wireless communication module in the battery management unit 02 can be propagated to the outside through the gap. Alternatively, an external electromagnetic wave can be propagated to the wireless communication module in the battery management unit 02 through the gap.

Certainly, in another implementation, the transmission structure 110 may alternatively be a structure such as a blind via. In addition, there may be one, two, or more transmission structures 110. A specific shape and quantity of the transmission structures 110 are not limited in this application.

Figures 6, 7, 8:
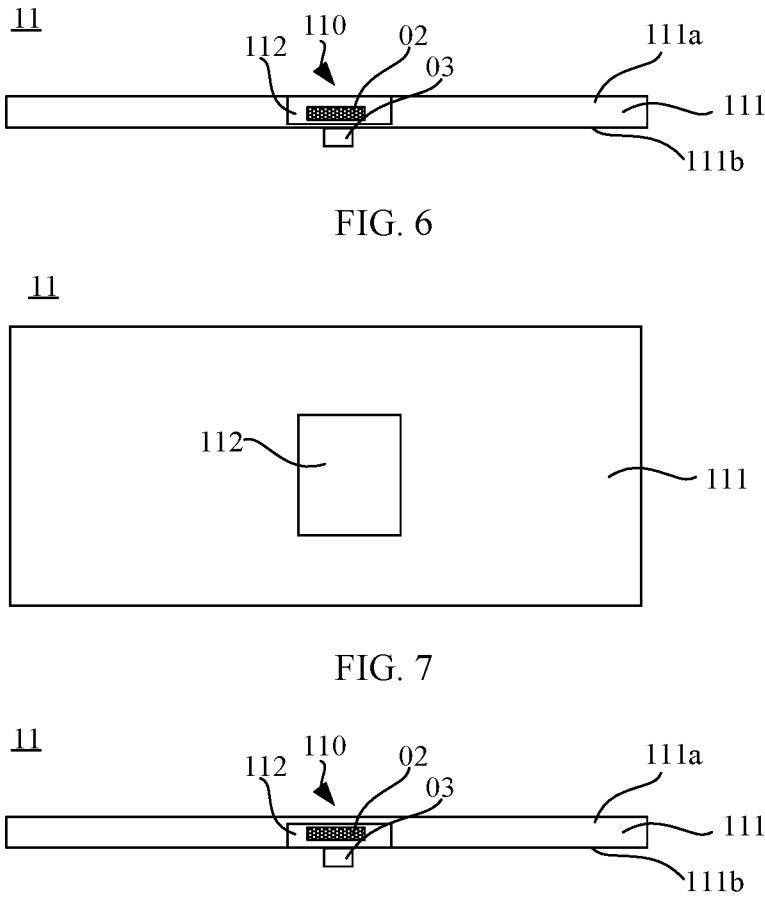
FIG. 6 is a schematic diagram of a cross-sectional structure of another battery cover plate according to an embodiment of this application.
FIG. 7 is a top view of FIG. 6.
FIG. 8 is a schematic diagram of a cross-sectional structure of another battery cover plate according to an embodiment of this application.

Alternatively, as shown in FIG. 6 and FIG. 7, in another example provided in this application, the transmission structure 110 may be further filled with an insulating material, to ensure flatness of the outer surface 111a. The insulating material filled in the transmission structure 110 may be the same as or different from the material of the insulator 112. In addition, when the insulator 112 is filled in the accommodating cavity, the insulating material may also be filled in the transmission structure 110 at the same time. The insulator 112 and the insulating material filled in the transmission structure 110 may be an integrally formed structure, so as to simplify a manufacturing process.

In addition, as shown in FIG. 8, in another example provided in this application, a second end (a lower end in the figure) of the insulator 112 may extend to the inner surface 111b, and the insulator 112 does not extend to the outer surface 111a. An anti-theft effect of the battery management unit 02 can be improved by using this structure.

Figures 9, 10:
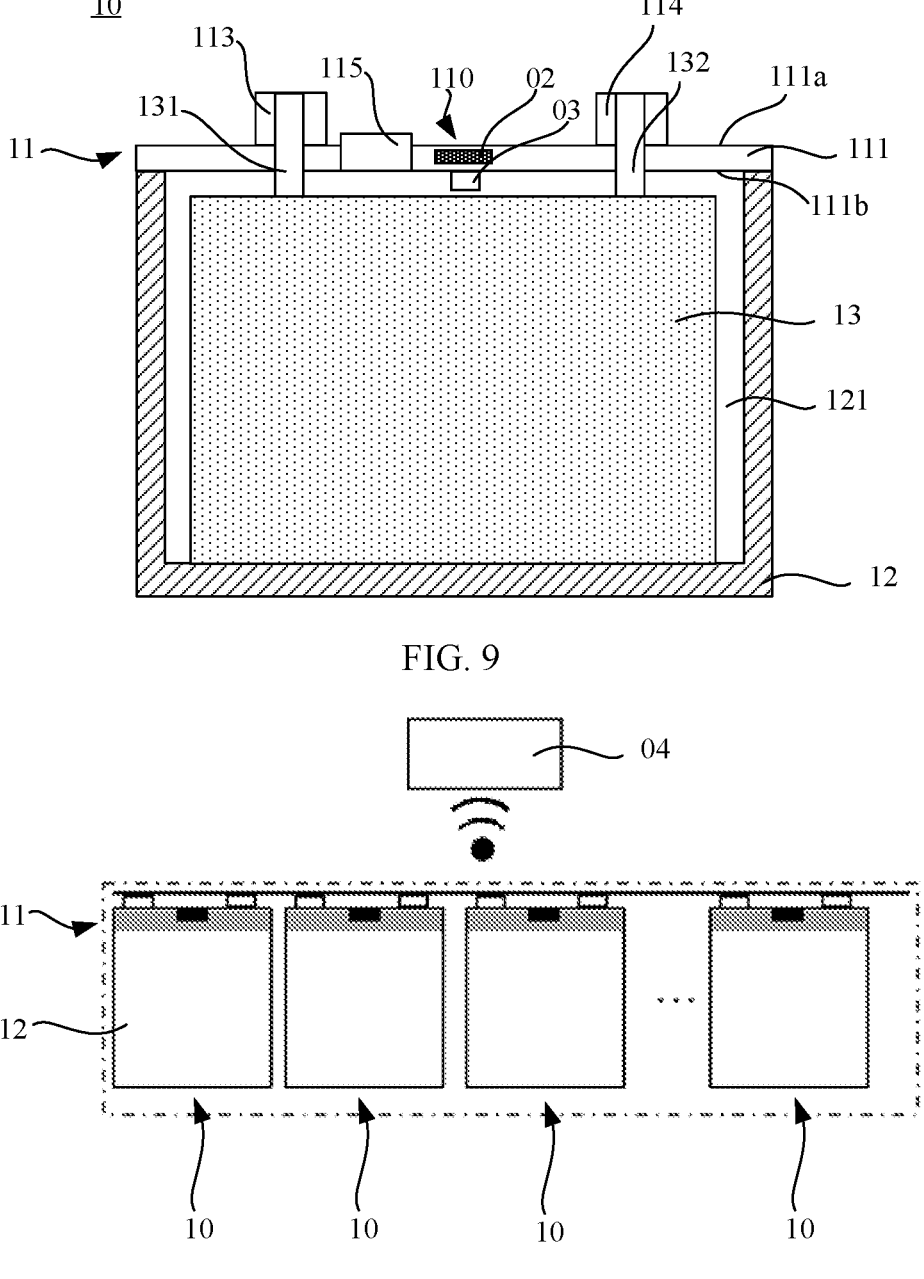
FIG. 9 is a schematic diagram of a cross-sectional structure of a battery according to an embodiment of this application.
FIG. 10 is a schematic diagram of a structure of a battery group according to an embodiment of this application.

For details, refer to FIG. 8 and FIG. 9. When the battery cover plate 11 covers the opening of the groove 121, the outer surface 111a may be a flat surface. Therefore, a position of the insulator 112 or a position of the battery management unit 02 is hidden. In addition, the plate body 111 and the housing 12 may be fixedly connected by using a screw, or a rivet, or by welding, so as to effectively improve an anti-theft effect of the battery management unit 02.

In addition, when the battery management unit 02 is injected into the insulator 112, injection molding may be performed on the sensor assembly 03 at the same time. Specifically, the battery management unit 02 and the sensor assembly 03 may be first connected, to implement a communication connection or a power supply connection between the battery management unit 02 and the sensor assembly 03. The battery management unit 02 is connected to the sensor assembly 03 by using a connection structure such as a microstrip or a conductive wire. Alternatively, the battery management unit 02 and the sensor assembly 03 may be disposed on a same circuit board. Then, the battery management unit 02 and the sensor assembly 03 are processed by using a process such as injection molding or compression molding, to prepare the insulator 112, and then the battery management unit 02 is injected into the insulator 112, and a part of the sensor assembly 03 is injected into the insulator 112. It should be noted that, when the injection molding is performed on the sensor assembly 03, a part (for example, a detection head) used for detection in the sensor assembly 03 extends out of the insulator 112, so as to prevent the insulator 112 from hindering detection performed by the sensor assembly 03.

In the example provided in this application, the battery management unit 02 and the part of the sensor assembly 03 may be injected into the insulator 112, so that the battery management unit 02, the sensor assembly 03, and the insulator 112 can be fastened. In addition, the insulator 112 can further effectively protect the battery management unit 02, the sensor assembly 03, and the connection structure between the battery management unit 02 and the sensor, thereby effectively improving security. In addition, it is also convenient to manufacture the battery management unit 02 and the sensor assembly 03 as an integrated structure by using the insulator 112, so that the battery management unit 02 and the sensor assembly 03 can be efficiently and accurately applied to the plate body 111, thereby improving manufacturing convenience and an application scope.

Certainly, in another implementation, a first end of the insulator 112 may extend to the outer surface 111a, and the second end may extend to the inner surface 111b, so that manufacturing efficiency can be effectively improved, and a manufacturing process can be simplified.

It should be noted that, in specific application, the sensor assembly 03 may include a temperature sensor, a barometric pressure sensor, a gas sensor, or the like. The temperature sensor may be configured to detect the temperature of the bare cell 13 (or in the groove 121). The barometric pressure sensor may be configured to detect barometric pressure in the groove 121. The gas sensor may be configured to detect gas composition in the groove 121, or may detect a proportion of the gas composition, or the like. In addition, the sensor assembly 03 may be disposed in the insulator 112, or may be disposed on the inner surface 111b of the plate body 111. Alternatively, some sensors in the sensor assembly 03 may be disposed in the insulator 112, and other sensors may be disposed on the inner surface 111b of the plate body 111.

Alternatively, in another implementation, the insulator 112 may be omitted. For example, the battery management unit 02 may also be fastened in the accommodating cavity by screwing, welding, bonding, or the like. When the battery cover plate 11 is impacted by vibration or external force, the battery management unit 02 can still be stably located in the accommodating cavity, so that the battery cover plate 11 has good structural safety. When the insulator 112 is not disposed, the accommodating cavity in the plate body 111 may be disposed in a position similar to a position of the insulator 112 in the foregoing example, and details are not described herein again.

During actual application, a molding mode and preparation process of the battery management unit 02, the insulator 112, and the plate body 111 can be flexibly adjusted, which is not limited in this application.

In addition, it should be noted that when the plate body 111 is made of an insulating material, the insulator 112 may be omitted. The battery management unit 02 may be disposed inside the plate body 111 by using a process such as injection molding or compression molding. Alternatively, at least a part of the plate body 111 may form the insulator 112.

In addition, as shown in FIG. 9, in an embodiment provided in this application, the battery cover plate 11 may further include a positive-electrode pole 113 and a negative-electrode pole 114. The positive-electrode pole 113 may be connected to a positive tab 131 of the bare cell 13, and the negative-electrode pole 114 may be connected to a negative tab 132 of the bare cell 13. Alternatively, it may be understood that electric energy of the bare cell 13 may be transmitted to an external electric device through the positive-electrode pole 113 and the negative-electrode pole 114. Alternatively, an external power supply device may supplement the electric energy to the bare cell 13 through the positive-electrode pole 113 and the negative-electrode pole 114.

In specific application, the positive-electrode pole 113 and the negative-electrode pole 114 may have various structures and shapes.

For example, the positive-electrode pole 113 and the negative-electrode pole 114 may be cylindrical structures. Alternatively, the positive-electrode pole 113 and the negative-electrode pole 114 may be conductive sheets or of other shapes and structures. Specific shapes of the positive-electrode pole 113 and the negative-electrode pole 114 are not limited in this application.

In addition, the positive-electrode pole 113 and the positive tab 131 may be connected by welding, abutting, or screwing. Correspondingly, the negative-electrode pole 114 and the negative tab 132 may be connected by welding, abutting, or screwing. A manner of connecting the positive-electrode pole 113 to the positive tab 131 and a manner of connecting the negative-electrode pole 114 to the negative tab 132 are not limited in this application.

In addition, in specific application, the battery management unit 02 may be connected to the positive-electrode pole 113 and the negative-electrode pole 114. When the positive-electrode pole 113 is connected to the positive tab 131 and the negative-electrode pole 114 is connected to the negative tab 132, the bare cell 13 can supply power to the battery management unit 02, to avoid that an additional power supply or a power supply device is disposed to supply power to the battery management unit 02.

Certainly, in other implementations, the battery management unit 02 may not be connected to the positive-electrode pole 113 or the negative-electrode pole 114. The battery cover plate 11 may be provided with a conductive contact connected to the battery management unit 02. After the battery cover plate 11 covers the groove 121, the conductive contact may be connected to the positive tab 131 and the negative tab 132, so that the bare cell 13 can supply power to the battery management unit 02.

In addition, in some implementations, the positive-electrode pole 113 and the positive tab 131 may be connected by using a fuse circuit (not shown in the figure). Specifically, the battery management unit 02 may be connected to the fuse circuit, and is configured to control a connected or disconnected state between the positive-electrode pole 113 and the positive tab 131. When communication connection is maintained between the battery management unit 02 and the battery management system 04, the battery management unit 02 may enable the positive-electrode pole 113 and the positive tab 131 to be in a connected state through the fuse circuit. When communication between the battery management unit 02 and the battery management system 04 is disconnected, the battery management unit 02 may disconnect the positive-electrode pole 113 from the positive tab 131 through the fuse circuit, so as to prevent the battery 10 from being used after the battery 10 is stolen. A condition for determining whether the communication connection is maintained between the battery management unit 02 and the battery management system 04 may be set according to an actual requirement. For example, it is assumed that the communication connection between the battery management unit 02 and the battery management system 04 is continuous and uninterrupted. In this case, if the battery management unit 02 does not communicate with the battery management system 04 within a time period greater than a preset time period (for example, 2 seconds), it indicates that the communication between the battery management unit 02 and the battery management system 04 is disconnected.

Alternatively, it is assumed that the communication connection between the battery management unit 02 and the battery management system 04 is periodic (for example, communication is performed every 5 seconds). In a preset time period (for example, 10 seconds), if at least one communication connection between the battery management unit 02 and the battery management system 04 exists, it may be determined that the communication connection between the battery management unit 02 and the battery management system 04 is maintained. If there is no communication connection between the battery management unit 02 and the battery management system 04 within 10 seconds, it indicates that the communication between the battery management unit 02 and the battery management system 04 is disconnected.

Certainly, during actual application, a condition for determining whether the battery management unit 02 is communicatively connected to the battery management system 04 may be properly set based on an actual situation. This is not limited in this application.

The fuse circuit may include a circuit switch, meaning that a connected or disconnected state between the positive-electrode pole 113 and the positive tab 131 may be switched for a plurality of times by using the fuse circuit. Alternatively, the fuse circuit may include a fuse, meaning that the fuse circuit may be one-off. After the fuse circuit disconnects the positive-electrode pole 113 from the positive tab 131 (that is, after the fuse is fused), the fuse circuit cannot be recovered. It may be understood that a specific type of the fuse circuit is not limited in this application.

In addition, the negative-electrode pole 114 may also be connected to the negative tab 132 through the fuse circuit, and details are not described herein.

It may be understood that the sensor assembly 03 also needs electric energy when working normally. The sensor assembly 03 is connected to the battery management unit 02, and electric energy of the bare cell 13 may be transmitted to the sensor assembly 03 through the battery management unit 02.

In some implementations, the battery management unit 02 may include a power supply control circuit (not shown in the figure), and the power supply control circuit may be configured to connect or disconnect power supply to/from the sensor assembly 03. For example, in specific application, the electric energy may be continuously transmitted to the sensor assembly 03, so that the sensor assembly 03 can continuously detect a related parameter. Alternatively, through the power supply control circuit, the electric energy may be intermittently transmitted to the sensor assembly 03, so that the electric energy can be effectively resolved, and a normal detection function of the sensor assembly 03 can be ensured.

In addition, in an example provided in this application, the battery cover plate 11 may further include an explosion-proof structure 115. The explosion-proof structure 115 is disposed on the plate body 111. Specifically, the explosion-proof structure 115 passes through the outer surface 111*a* and the inner surface 111*b* of the plate body 111. When barometric pressure in the groove 121 is excessively high, the explosion-proof structure 115 may implement pressure relief, to prevent an adverse situation such as explosion of the battery 10.

In specific arrangement, the explosion-proof structure 115 may be a well-known conventional structure such as an explosion-proof film or an explosion-proof valve, and details are not described herein.

It may be understood that in the foregoing example, one battery 10 is used as an example for description. During actual application, a plurality of batteries 10 may be disposed in a group.

For example, as shown in FIG. 10, in an example provided in this application, the plurality of batteries 10 may be included. Each battery 10 includes a housing 12, a bare cell (not shown in the figure), and a battery cover plate 11. The plurality of batteries 10 may be disposed in series or in parallel to meet a required power supply requirement. Alternatively, it may be understood that each battery 10 is independent of each other. During actual application, a quantity of required batteries 10 and a position in which the battery 10 is disposed may be flexibly adjusted according to an actual requirement, so that the battery 10 has relatively good adaptability.

Figure 11:
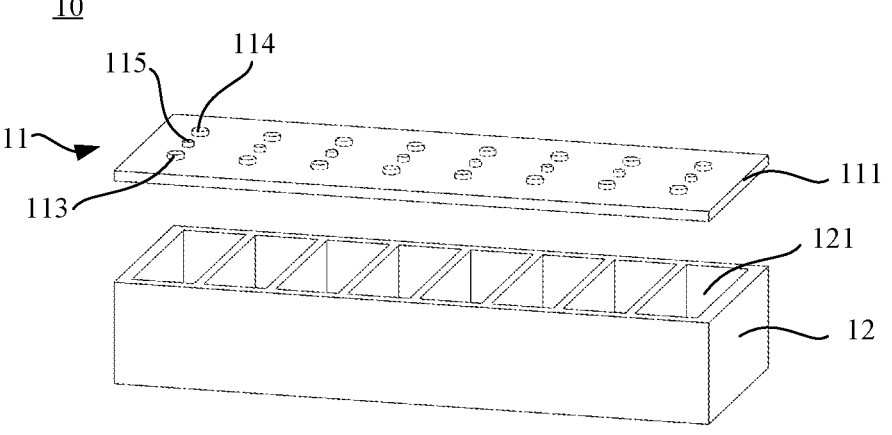
FIG. 11 is a schematic exploded diagram of a structure of another battery according to an embodiment of this application.

Alternatively, as shown in FIG. 11, in another example provided in this application, the housing 12 has a plurality of grooves 121 (eight grooves are shown in the figure), and the plurality of grooves 121 face a same direction. Media such as a bare cell (not shown in the figure) and an electrolyte may be disposed in each groove 121, and multiple bare cells may be connected in series or in parallel. In addition, the battery cover plate 11 may simultaneously cover multiple grooves 121, thereby effectively reducing assembly difficulty and reducing convenience during manufacturing. When the battery cover plate 11 is disposed, the battery cover plate 11 may include a plurality of battery management units (not shown in the figure), a sensor assembly (not shown in the figure), and an explosion-proof structure 115. Specifically, a quantity of disposed grooves 121 (or bare cells) may be the same as a quantity of disposed battery management units, sensor assemblies, and explosion-proof structures 115. In other words, the battery management unit, the sensor assembly, and the explosion-proof structure 115 in the battery cover plate 11 are disposed in one-to-one correspondence with the groove 121 (or the bare cell), so that each groove 121 (or the bare cell) is equipped with an independent battery management unit, a sensor assembly, and an explosion-proof structure 115, so that independent detection, control, or pressure relief is performed on each bare cell, thereby facilitating refined management.

Certainly, in specific application, the quantity of disposed battery management units may also be less than the quantity of disposed sensor assemblies or grooves 121.

For example, only one battery management unit may be provided in the battery cover plate 11, and the battery management unit may be connected to each sensor assembly and the bare cell, so that the quantity of disposed battery management units can be effectively reduced, thereby helping reduce manufacturing costs of the battery cover plate 11.

It may be understood that the quantity of disposed battery management units is not limited in this application.

During actual application, the battery 10 provided in the embodiment of this application may be applied to a plurality of different application scenarios.

Figure 12:
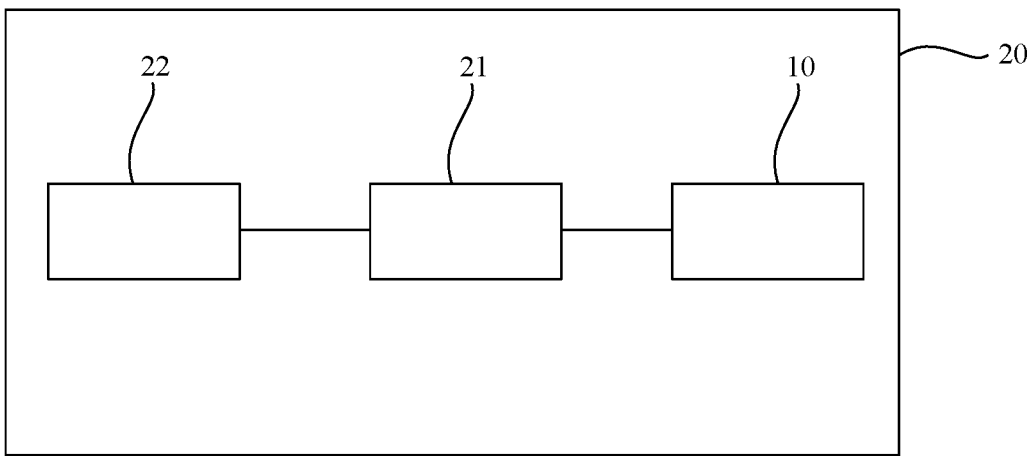
FIG. 12 is a block diagram of a structure of a power system according to an embodiment of this application.

For example, as shown in FIG. 12, an embodiment of this application further provides a power system 20. The power system 20 may include an inverter 21, a power device 22, and any one of the foregoing batteries 10. The power device 22 may be connected to the battery 10 by using the inverter 21. A type of the electric energy in the battery 10 is generally a direct current, and a power consumption type of the power device 22 may be an alternating current. The inverter 21 may be configured to implement conversion between the alternating current and the direct current.

In specific application, the power device 22 may be a wind power generation device, a solar power generation device, or the like. Alternatively, it may be understood that the power system 20 may be a wind power system or a solar power system.

In addition, in some implementations, the power device 22 may alternatively be an electric device such as a motor. A specific type of the power device 22 is not limited in this application.

Alternatively, the battery 10 may be applied to a terminal such as a mobile phone, a vehicle, a ship, an unmanned aerial vehicle, or a base station, and is also used for power station energy storage, home energy storage, or the like. An application scenario of the battery 10 is not limited in this application.

In addition, the battery management system 04 may be disposed at a terminal, or may be disposed at a remote end. For example, when the battery 10 is applied to a vehicle, the battery management system 04 may be installed on the vehicle. Alternatively, the battery management unit 02 may be disposed at a location such as the base station. In other words, when the battery management unit 02 is connected to the battery management system 04 in a wireless communication manner, a layout position of the battery management system 04 may be adjusted according to an actual situation, thereby achieving relatively high flexibility.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A battery cover plate comprising:
a plate body provided with an outer surface and an inner surface facing away from the outer surface;
a battery management unit disposed in the plate body and comprising a wireless communication module capable of performing wireless communication with a device outside the outer surface by using a transmission structure provided between the battery management unit and the outer surface,
wherein the battery management unit is configured to be connected to a positive tab and a negative tab of a bare cell for detecting parameters,
wherein the parameters include at least one of a status of charges and a power status of the bare cell, and
wherein the parameters are used to regulate and control a charging/discharging state; and
a sensor assembly connected to the battery management unit, disposed in the plate body, and extending out of the inner surface.

2. The battery cover plate according to claim 1, wherein the plate body has an insulator, and the battery management unit is located in the insulator.

3. The battery cover plate according to claim 2, wherein the insulator is located inside the plate body, and an end of the transmission structure extends to the insulator.

4. The battery cover plate according to claim 3, wherein the transmission structure comprises a gap or a blind via.

5. The battery cover plate according to claim 3, wherein the transmission structure is filled with an insulating material.

6. The battery cover plate according to claim 5, wherein the insulator and the insulating material filled in the transmission structure are an integrally formed structure.

7. The battery cover plate according to claim 1, wherein an end of an insulator extends to the inner surface, and the sensor assembly is disposed on the insulator.

8. The battery cover plate according to claim 1, wherein the plate body is made of an insulating material.

9. The battery cover plate according to claim 1, wherein the sensor assembly comprises at least one of a temperature sensor, a barometric pressure sensor, or a gas sensor.

10. The battery cover plate according to claim 1, wherein the battery cover plate further comprises a positive-electrode pole and a negative-electrode pole disposed on the plate body, wherein the battery management unit is connected to the positive-electrode pole and the negative-electrode pole.

11. The battery cover plate according to claim 1, wherein the battery management unit comprises a power supply control circuit configured to connect or disconnect power supply to/from the sensor assembly.

12. The battery cover plate according to claim 1, wherein the battery cover plate further comprises an explosion-proof structure disposed on the plate body.

13. A battery comprising a housing having a groove and a bare cell disposed in the groove, wherein the battery further comprises:
a battery cover plate comprising a plate body provided with an outer surface and an inner surface facing away from the outer surface;
a battery management unit disposed in the plate body and comprising a wireless communication module capable of performing wireless communication with the outer surface by using a transmission structure provided between the battery management unit and the outer surface,
wherein the battery management unit is configured to be connected to a positive tab and a negative tab of a bare cell to detect parameters,
wherein the parameters include at least one of a status of charges and a power status of the bare cell, and
wherein the parameters are used to regulate and control a charging/discharging state; and a sensor assembly connected to the battery management unit, disposed in the plate body, and extending out of the inner surface, wherein the battery cover plate covers an opening of the groove, wherein the inner surface faces the groove, and wherein the sensor assembly extends into the groove.

14. The battery according to claim 13, wherein the battery management unit is electrically connected to the bare cell.

15. The battery according to claim 13, wherein the groove in the housing is among a plurality of grooves in the housing, wherein a quantity of sensor assemblies is the same as a quantity of the plurality of grooves, and the quantity of the sensor assemblies are disposed in one-to-one correspondence with the quantity of the plurality of grooves.

16. The battery according to claim 14, wherein the groove in the housing is among a plurality of grooves in the housing, wherein a quantity of sensor assemblies is the same as a quantity of the plurality of grooves, and the quantity of the sensor assemblies are disposed in one-to-one correspondence with the quantity of the plurality of grooves.

17. The battery according to claim 13, wherein the battery further comprises a battery management system connected to the battery management unit in a wireless communication manner.

18. A power system comprising:

an inverter connected to a battery and configured to convert an alternating current into a direct current and then provide the direct current for the battery, or convert a direct current from the battery into an alternating current;

a housing for the battery, wherein the battery comprises a bare cell, and wherein the bare cell is disposed in a groove of the housing;

a battery cover plate comprising a plate body provided with an outer surface and an inner surface facing away from the outer surface;

a battery management unit disposed in the plate body and comprising a wireless communication module capable of performing wireless communication with a device outside the outer surface by using a transmission structure provided between the battery management unit and the outer surface, wherein the battery management unit is configured to be connected to a positive tab and a negative tab of the bare cell to detect parameters, wherein the parameters include at least one of a status of charges and a power status of the bare cell, and wherein the parameters are used to regulate and control a charging/discharging state; and a sensor assembly connected to the battery management unit, disposed in the plate body, and extending out of the inner surface, wherein the battery cover plate covers an opening of the groove, the inner surface faces the groove, and the sensor assembly extends into the groove.

19. The power system according to claim 18, wherein the plate body has an insulator, and the battery management unit is located in the insulator.

20. The power system according to claim 19, wherein the insulator is located inside the plate body, and an end of the transmission structure extends to the insulator.

*   *   *   *   *